(12) United States Patent
Kitajima

(10) Patent No.: US 11,503,219 B2
(45) Date of Patent: Nov. 15, 2022

(54) IMAGE PROCESSING APPARATUS, IMAGE CAPTURE APPARATUS, AND CONTROL METHOD FOR ADDING AN EFFECT OF A VIRTUAL LIGHT SOURCE TO A SUBJECT

(71) Applicant: CANON KABUSHIKI KAISHA, Tokyo (JP)

(72) Inventor: Kotaro Kitajima, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/879,260

(22) Filed: May 20, 2020

(65) Prior Publication Data
US 2020/0280667 A1 Sep. 3, 2020

Related U.S. Application Data

(63) Continuation of application No. 16/203,914, filed on Nov. 29, 2018, now Pat. No. 10,694,111, which is a
(Continued)

(30) Foreign Application Priority Data
Feb. 18, 2016 (JP) .................................. 2016-029134

(51) Int. Cl.
*H04N 5/235* (2006.01)
*G06V 10/42* (2022.01)
(Continued)

(52) U.S. Cl.
CPC ......... *H04N 5/2352* (2013.01); *G06K 9/6267* (2013.01); *G06V 10/42* (2022.01);
(Continued)

(58) Field of Classification Search
CPC .. H04N 5/2354; H04N 5/23229; H04N 5/243; H04N 5/2351; H04N 5/235;
(Continued)

(56) References Cited

U.S. PATENT DOCUMENTS 8,988,549 B2  3/2015  Kitajima
9,129,188 B2  9/2015  Hata et al.
(Continued)

FOREIGN PATENT DOCUMENTS

JP  2010135996 A  6/2010
JP  2013235537 A  11/2013
(Continued)

OTHER PUBLICATIONS

Notice of Reasons for Refusal issued by the Japanese Patent Office dated Oct. 18, 2019 in corresponding Japanese Patent Application No. 2016-029134 with English translation.

*Primary Examiner* — Nicholas G Giles
(74) *Attorney, Agent, or Firm* — Carter, DeLuca & Farrell LLP

(57) ABSTRACT

With respect to a subject included in an image, the illuminating condition by an ambient light source in an environment where the image was captured is estimated, and based on the estimation result, the effect of a virtual light source that was non-existent at the time of image capture is computed. More specifically, the effect of the virtual light source is computed using an illumination direction of the virtual light source and the reflective characteristics of the subject illuminated by the virtual light source, which have been determined based on the estimation result, and an image derived from addition of the effect of the virtual light source is output.

11 Claims, 14 Drawing Sheets

Related U.S. Application Data continuation of application No. 15/432,412, filed on Feb. 14, 2017, now Pat. No. 10,171,744.

(51) Int. Cl.
| | |
|---|---|
| *G06V 10/44* | (2022.01) |
| *G06V 10/56* | (2022.01) |
| *G06V 10/60* | (2022.01) |
| *G06V 40/16* | (2022.01) |
| *G06K 9/62* | (2022.01) |
| *H04N 5/262* | (2006.01) |
| *G06V 10/46* | (2022.01) |

(52) U.S. Cl.
CPC ............. *G06V 10/44* (2022.01); *G06V 10/56* (2022.01); *G06V 10/60* (2022.01); *G06V 40/165* (2022.01); *H04N 5/2354* (2013.01); *H04N 5/2621* (2013.01); *G06V 10/467* (2022.01)

(58) Field of Classification Search
CPC ............. H04N 5/2352; H04N 5/2621; G06K 9/00248; G06K 9/4604; G06K 9/4652; G06K 9/4661; G06K 9/52; G06K 9/6267
See application file for complete search history.

(56) References Cited

U.S. PATENT DOCUMENTS

| | | | |
|---|---|---|---|
| 9,338,419 | B2 | 5/2016 | Kitajima |
| 9,894,315 | B2 | 2/2018 | Kitajima |
| 10,171,744 | B2 * | 1/2019 | Kitajima ............ H04N 5/2621 |
| 10,694,111 | B2 * | 6/2020 | Kitajima ............ G06K 9/6267 |
| 2003/0052991 | A1 | 3/2003 | Stavely et al. |
| 2010/0134495 | A1 | 6/2010 | Matsui |
| 2012/0120071 | A1 | 5/2012 | Thorn |
| 2014/0147090 | A1 | 5/2014 | Kitajima |
| 2014/0147091 | A1 | 5/2014 | Kitajima |
| 2015/0178550 | A1 * | 6/2015 | Hirashima ......... G06K 9/00268 382/118 |
| 2017/0195540 | A1 | 7/2017 | Sambongi et al. |

FOREIGN PATENT DOCUMENTS

| | | |
|---|---|---|
| JP | 2015111238 A | 6/2015 |
| JP | 2016006627 A | 1/2016 |

* cited by examiner

F I G. 7

| DIFFUSION DEGREE OF AMBIENT LIGHT / DIRECTION OF AMBIENT LIGHT | LOW DIFFUSION DEGREE OF AMBIENT LIGHT (HIGH CONTRAST) | HIGH DIFFUSION DEGREE OF AMBIENT LIGHT (LOW CONTRAST) |
|---|---|---|
| OBLIQUE LIGHT | LIGHT TO BE REFLECTED PRIMARILY BY DIFFUSE REFLECTION, FROM SIDE OPPOSITE TO AMBIENT LIGHT SIDE | LIGHT TO BE REFLECTED PRIMARILY BY SPECULAR REFLECTION, OBLIQUELY WITH RESPECT TO SUBJECT |
| FOLLOW LIGHT | LIGHT TO BE REFLECTED PRIMARILY BY DIFFUSE REFLECTION, IN DIRECTION FACING FRONT OF SUBJECT (OR OBLIQUELY WITH RESPECT TO SUBJECT) | |
| BACKLIGHT | LIGHT TO BE REFLECTED PRIMARILY BY DIFFUSE REFLECTION, OBLIQUELY WITH RESPECT TO SUBJECT LIGHT TO BE REFLECTED PRIMARILY BY SPECULAR REFLECTION | |

FIG. 11

| SHOOTING MODE \ BRIGHTNESS OF SUBJECT | DARK MAIN SUBJECT | BRIGHT MAIN SUBJECT |
|---|---|---|
| PORTRAIT | LIGHT TO BE REFLECTED PRIMARILY BY DIFFUSE REFLECTION, FROM POSITION DIAGONALLY IN FRONT OF SUBJECT<br>LIGHT TO BE REFLECTED PRIMARILY BY SPECULAR REFLECTION | LIGHT TO BE REFLECTED PRIMARILY BY SPECULAR REFLECTION, OBLIQUELY WITH RESPECT TO SUBJECT |
| FOOD | LIGHT TO BE REFLECTED PRIMARILY BY DIFFUSE REFLECTION, FROM ABOVE SUBJECT<br>LIGHT TO BE REFLECTED PRIMARILY BY SPECULAR REFLECTION, FROM POSITION DIAGONALLY BEHIND SUBJECT | LIGHT TO BE REFLECTED PRIMARILY BY SPECULAR REFLECTION, FROM POSITION DIAGONALLY BEHIND SUBJECT |
| FLOWER/PLANT | LIGHT TO BE REFLECTED PRIMARILY BY DIFFUSE REFLECTION, FROM POSITION DIAGONALLY IN FRONT OF SUBJECT | NO RE-LIGHTING |

IMAGE PROCESSING APPARATUS, IMAGE CAPTURE APPARATUS, AND CONTROL METHOD FOR ADDING AN EFFECT OF A VIRTUAL LIGHT SOURCE TO A SUBJECT

CROSS REFERENCE TO RELATED APPLICATIONS

This application is a continuation of U.S. patent application Ser. No. 16/203,914, filed on Nov. 29, 2018, which is a continuation of U.S. patent application Ser. No. 15/432,412, filed on Feb. 14, 2017, now U.S. Pat. No. 10,171,744, which claims the benefit of and priority to Japanese Patent Application No. 2016-029134, filed on Feb. 18, 2016, each of which is hereby incorporated by reference herein in their entirety.

BACKGROUND OF THE INVENTION

Field of the Invention

The present invention relates to an image processing apparatus, an image capture apparatus, and a control method, and particularly to an image processing technique for adding, to an image, an illumination effect of a virtual light source that is supplementarily defined after shooting.

Description of the Related Art

There is a technique for reducing shadows cast on a subject by adding, to an image obtained after shooting, an illumination effect of a virtual light source that was non-existent in a shooting environment. Japanese Patent Laid-Open No. 2010-135996 describes a technique for detecting a face region in an image, and adjust the brightness using a defined virtual light source with respect to the face region and a shadow region with luminance lower than the average luminance of the face region.

Although the technique described in Japanese Patent Laid-Open No. 2010-135996 defines the tints, intensity distribution, and direction of the virtual light source to adjust the brightness with respect to a target subject, this technique has the possibility that a favorable illumination effect may not be added in consideration of the environment in which the image was shot and the subject. For example, this technique has the possibility that gloss and luster, as well as a stereoscopic effect with an enhanced contrast, may not be favorably represented.

SUMMARY OF THE INVENTION

The present invention was made in view of such problems in the conventional technique. The present invention provides an image processing apparatus, an image capture apparatus, and a control method that generate an image to which a favorable illumination effect has been added in accordance with a scene and a subject after image capture.

The present invention in its first aspect provides an n image processing apparatus, comprising: an obtainment unit configured to obtain an image derived from image capture; a computation unit configured to compute an effect of a virtual light source on a subject included in the image obtained by the obtainment unit, the virtual light source being non-existent at the time of the image capture; and an output unit configured to output an image derived from addition of the effect of the virtual light source to the subject based on a result of the computation by the computation unit, wherein the computation unit includes: an estimation unit configured to, based on the obtained image, estimate an illuminating condition by an ambient light source in an environment where the image was captured, a determination unit configured to, based on a result of the estimation by the estimation unit, determine an illumination direction of the virtual light source and reflective characteristics of the subject illuminated by the virtual light source, and a processing unit configured to compute the effect of the virtual light source based on the illumination direction of the virtual light source and the reflective characteristics of the subject determined by the determination unit.

The present invention in its second aspect provides an image processing apparatus, comprising: an obtainment unit configured to obtain an image derived from image capture; a computation unit configured to compute an effect of a virtual light source on a subject included in the image obtained by the obtainment unit, the virtual light source being non-existent at the time of the image capture; and an output unit configured to output an image derived from addition of the effect of the virtual light source to the subject based on a result of the computation by the computation unit, wherein the computation unit includes: a determination unit configured to, based on a shooting scene of the obtained image or a type of the subject, determine an illumination direction of the virtual light source and reflective characteristics of the subject illuminated by the virtual light source, and a processing unit configured to compute the effect of the virtual light source based on the illumination direction of the virtual light source and the reflective characteristics of the subject determined by the determination unit.

The present invention in its third aspect provides an image capture apparatus, comprising: an image capture unit configured to generate an image through image capture; and an image processing apparatus that obtains the image generated by the image capture unit and outputs an image derived from addition of an effect of a virtual light source, wherein the image processing apparatus comprising: an obtainment unit configured to obtain an image derived from image capture; a computation unit configured to compute the effect of the virtual light source on a subject included in the image obtained by the obtainment unit, the virtual light source being non-existent at the time of the image capture; and an output unit configured to output an image derived from addition of the effect of the virtual light source to the subject based on a result of the computation by the computation unit, wherein the computation unit includes an estimation unit configured to, based on the obtained image, estimate an illuminating condition by an ambient light source in an environment where the image was captured, a determination unit configured to, based on a result of the estimation by the estimation unit, determine an illumination direction of the virtual light source and reflective characteristics of the subject illuminated by the virtual light source, and a processing unit configured to compute the effect of the virtual light source based on the illumination direction of the virtual light source and the reflective characteristics of the subject determined by the determination unit.

The present invention in its fourth aspect provides an image processing apparatus, comprising: an evaluation unit configured to evaluate a state of light illumination of a subject included in a shot image, the light illumination being performed by an ambient light source at the time of shooting; and a generation unit configured to generate a corrected image by applying, to the shot image, image processing for adding an effect of light illumination performed by a virtual light source based on the evaluation by the evaluation unit, the virtual light source being non-existent at the time of the shooting, wherein in applying the image processing, the generation unit controls an arrangement of the virtual light source and reflective characteristics of the subject under the light illumination performed by the virtual light source based on the evaluation by the evaluation unit.

The present invention in its fifth aspect provides a control method for an image processing apparatus, the control method comprising: obtaining an image derived from image capture; computing an effect of a virtual light source on a subject included in the obtained image, the virtual light source being non-existent at the time of the image capture; and outputting an image derived from addition of the effect of the virtual light source to the subject based on a result of the computing, wherein the computing includes: based on the obtained image, estimating an illuminating condition by an ambient light source in an environment where the image was captured, based on a result of the estimation in the estimating, determining an illumination direction of the virtual light source and reflective characteristics of the subject illuminated by the virtual light source, and executing processing for computing the effect of the virtual light source based on the determined illumination direction of the virtual light source and the determined reflective characteristics of the subject.

The present invention in its sixth aspect provides a control method for an image processing apparatus, the control method comprising: evaluating a state of light illumination of a subject included in a shot image, the light illumination being performed by an ambient light source at the time of shooting; and generating a corrected image by applying, to the shot image, image processing for adding an effect of light illumination performed by a virtual light source based on the evaluation in the evaluating, the virtual light source being non-existent at the time of the shooting, wherein in applying the image processing in the generating, an arrangement of the virtual light source and reflective characteristics of the subject under the light illumination performed by the virtual light source are controlled based on the evaluation in the evaluating.

Further features of the present invention will become apparent from the following description of exemplary embodiments (with reference to the attached drawings).

BRIEF DESCRIPTION OF THE DRAWINGS

FIG. 7 shows examples of determination criteria for various virtual light source parameters according to the first embodiment of the present invention.

FIG. 11 shows examples of determination criteria for various virtual light source parameters according to the second embodiment of the present invention.

DESCRIPTION OF THE EMBODIMENTS

First Embodiment

The following describes an exemplary embodiment of the present invention in detail with reference to the drawings. Note that the embodiment described below presents an example in which the present invention is applied to a digital camera—one example of an image processing apparatus—that can execute re-lighting processing for adding an illumination effect of a virtual light source. However, an image capture function is not an essential element in embodying the present invention, and the present invention is applicable to any apparatus that can execute various types of processing for adding an illumination effect of a supplementary virtual light source to image signals. In the present specification, "re-lighting processing" denotes processing for supplementarily defining a virtual light source that was non-existent in the actual shooting environment and adding an illumination effect of the virtual light source with respect to image signals obtained through image capture.

<<Configuration of Digital Camera 100>>

Figure 1:
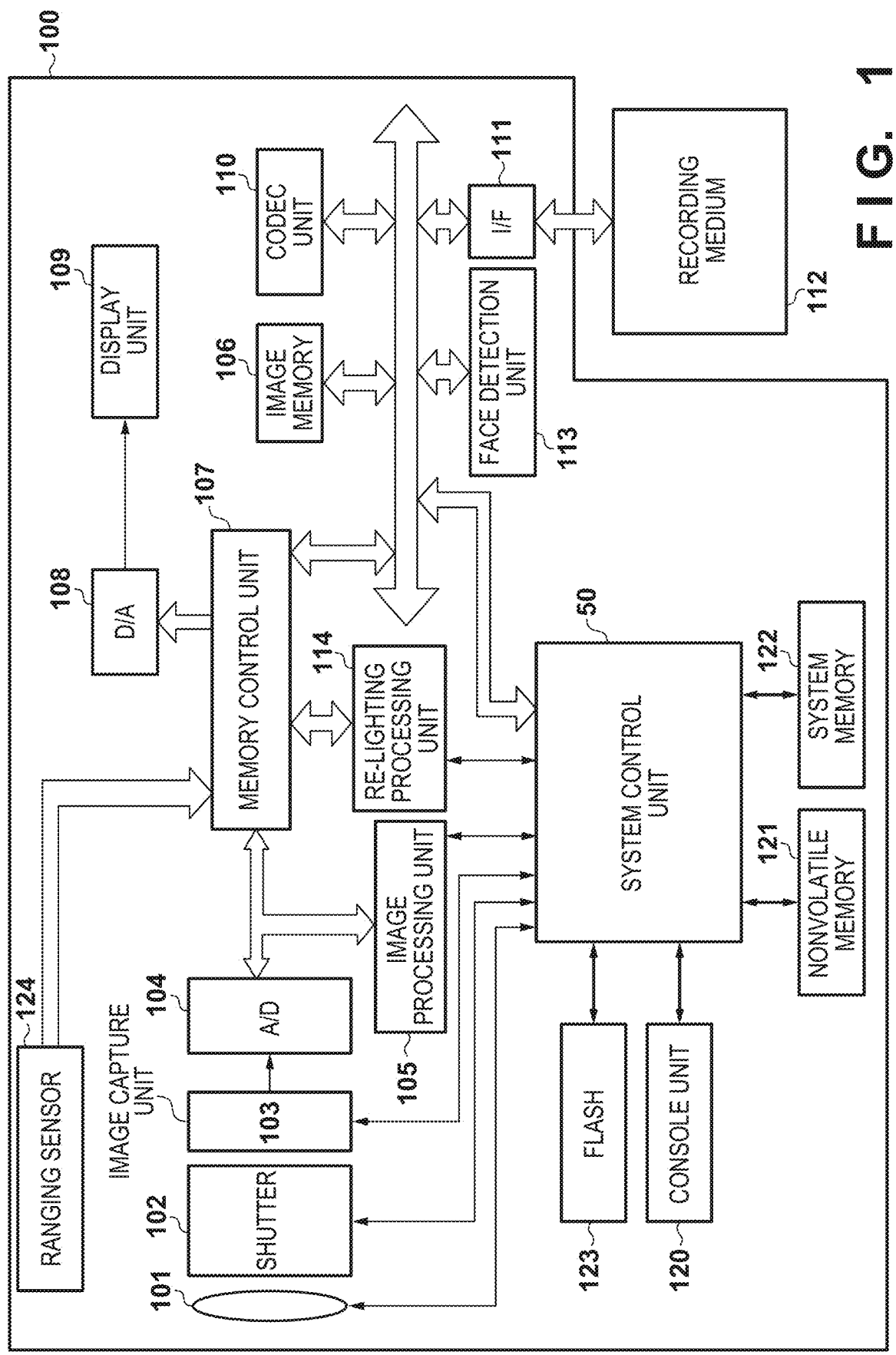
FIG. 1 is a block diagram showing a functional configuration of a digital camera 100 according to one or more embodiments of the present invention.

FIG. 1 is a block diagram showing a functional configuration of a digital camera 100 according to one or more embodiments of the present invention.

A lens group 101 is an image capture optical system including a zoom lens and a focusing lens, and directs light beams reflected by a subject in a shooting environment and light beams from light sources to an image capture unit 103. A shutter 102 having diaphragm functions controls the light amounts of directed light beams, and the image capture unit 103 converts the resultant light beams into analog image signals. The image capture unit 103 is, for example, a CCD, a CMOS sensor, or another image capture apparatus; the image capture unit 103 photoelectrically converts an optical image formed on an imaging plane, and outputs the resultant analog image signals. An A/D converter 104 converts the analog image signals output from the image capture unit 103 into digital image signals (image data), and an image processing unit 105 applies various types of image processing, such as white balance processing, gamma correction processing, edge enhancement processing and color correction processing, to the digital image signals (image data). A face detection unit 113 executes face detection processing for detecting a face region of a human included in input image data, and outputs a detection result. A re-lighting processing unit 114 applies re-lighting processing for adding an illumination effect of a virtual light source to input image data. In various types of image-related processing, an image memory 106 is usable as a working area and a data storage area, and a memory control unit 107 controls the overall operations related to access (e.g., writing and reading) to the image memory 106.

The details of the image processing unit 105 and re-lighting processing unit 114 will be described later using other drawings. In the following description, each of various types of image processing executed by the digital camera 100 according to the present embodiment is discretely configured in correspondence with the image processing unit 105, face detection unit 113, or re-lighting processing unit 114. However, it should be easily understood that, in one or more embodiments of the present invention, these various types of image processing can be configured in correspondence with an arbitrary number of processing circuits, where the arbitrary number is one or more.

Once various types of image processing and overlap processing have been applied to image data obtained through image capture, a D/A converter 108 converts the image data into analog image signals for display. A display unit 109 (e.g., an LCD) displays the analog image signals for display, thereby providing the functions of an electronic viewfinder to a photographer. In recording (storing) image data obtained through a shooting operation, a codec unit 110 converts the image data into data for recording in accordance with a preset compression and encoding format, and the data for recording is recorded to a recording medium 112, which is a built-in memory, a memory card or another recording apparatus, via an I/F 111. In displaying image data recorded in the recording medium 112, the codec unit 110 decodes the image data.

A system control unit 50 is, for example, a CPU or another computation apparatus, and controls the operations of blocks included in the digital camera 100. More specifically, the system control unit 50 controls the operations of the blocks by reading out operation programs of the blocks stored in a nonvolatile memory 121, extracting the operation programs to a system memory 122, and executing the operation programs. The nonvolatile memory 121 is, for example, an EEPROM or another nonvolatile storage apparatus. The nonvolatile memory 121 stores, for example, various types of parameters necessary for the operations of the blocks, in addition to the operation programs of the blocks. The system memory 122 may be a rewritable volatile memory, and is used not only as an area to which the operation programs of the blocks are extracted, but also as a storage area that temporarily holds, for example, intermediate data that is output along with the operations of the blocks.

The system control unit 50 also performs exposure control and ranging control (control over the states of the lens group 101, shutter 102, and image capture unit 103) related to image capture based on predetermined evaluation values that have been generated by the image processing unit 105 using the result of face detection by the face detection unit 113 and image data obtained through image capture. As a result, through-the-lens (TTL) autofocus (AF) processing, auto exposure (AE) processing, auto white balance (AWB) processing, and the like are realized.

The digital camera 100 also includes a flash 123 that functions as a real light source at the time of shooting, a ranging sensor 124 that measures a distance between the digital camera 100 and the subject, and a console unit 120 serving as a user interface that detects various types of operational input. When the console unit 120 detects that an operation input has been made, it outputs a corresponding control signal to the system control unit 50.

In the following description of the present embodiment, processing is realized by circuits and processors corresponding to blocks that are included in the digital camera 100 as items of hardware. However, the present invention is not limited to being embodied in this way, and processing of the blocks may be realized by programs that execute processing similar to the processing of the blocks.

<Configuration of Image Processing Unit 105>

Figure 2:
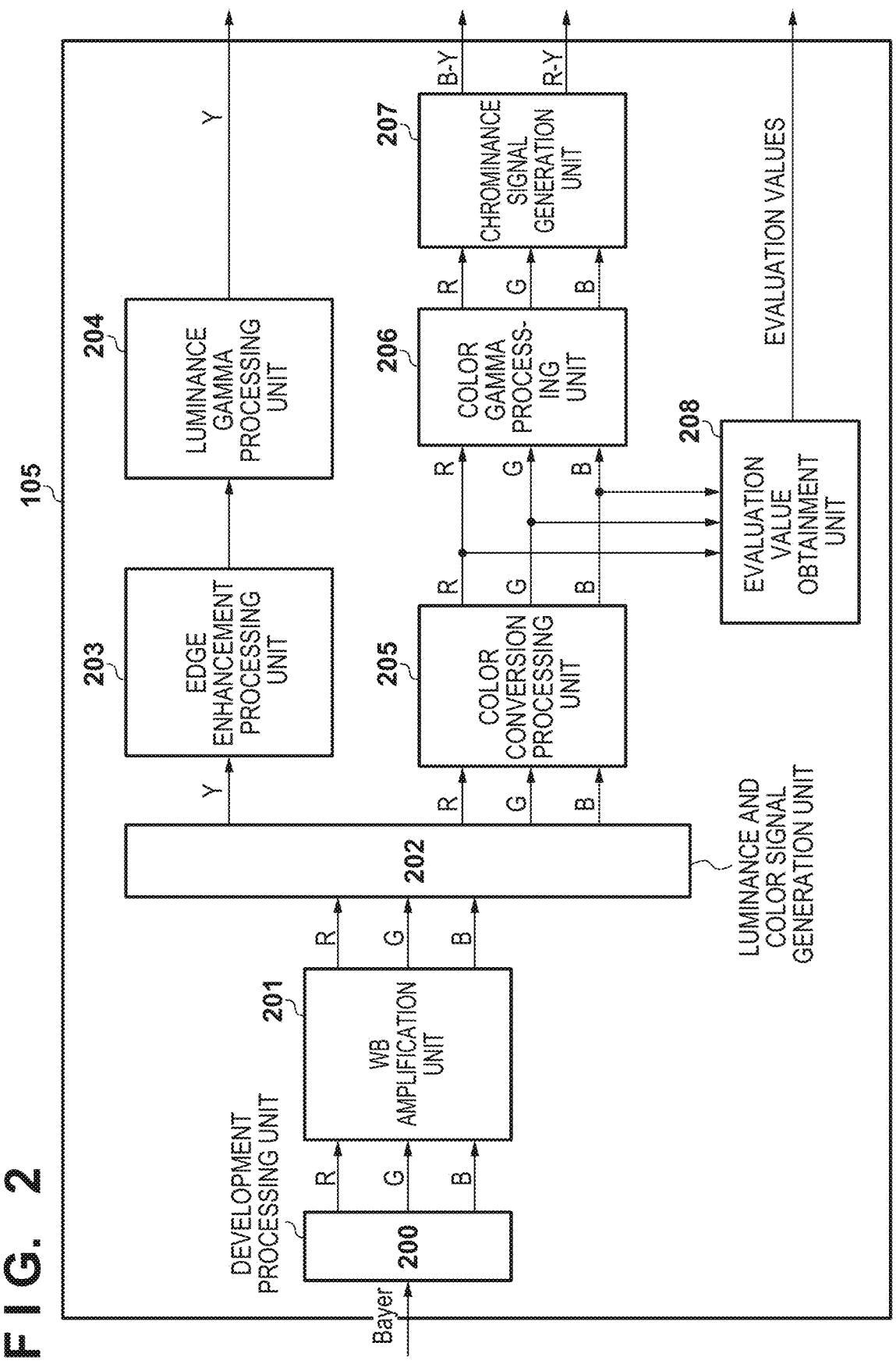
FIG. 2 is a block diagram showing a detailed configuration of an image processing unit 105 according to one or more embodiments of the present invention.

A configuration of the image processing unit 105 will now be described in detail using a block diagram of FIG. 2. It will be assumed that, along with image capture by the digital camera 100 according to the present embodiment, the image processing unit 105 receives, as input, a digital image signal of a Bayer format that indicates a signal level of one of R, G, and B components for each pixel.

A development processing unit 200 applies development processing to the input image signal of the Bayer format to interpolate color components without signal levels for each pixel of the image signal, thereby generating image signals of R, G, and B components (RGB signals). A WB amplification unit 201 adjusts white balance (WB) by amplifying the signal level of each color component of the RGB signals based on a WB gain value determined by the system control unit 50. A luminance and color signal generation unit 202 generates a luminance signal (Y signal) from the WB-adjusted RGB signals, and outputs the luminance signal (Y signal) to an edge enhancement processing unit 203. The luminance and color signal generation unit 202 also outputs the input RGB signals to a color conversion processing unit 205.

The edge enhancement processing unit 203 applies edge enhancement processing to the input Y signal, and outputs the resultant Y signal to a luminance gamma processing unit 204. The luminance gamma processing unit 204 applies gamma correction processing to the Y signal derived from the edge enhancement processing, and outputs the corrected Y signal to the image memory 106 via the memory control unit 107.

On the other hand, the color conversion processing unit 205 applies predetermined matrix computation to the input RGB signals to change the signal levels of the color components to achieve a preset color balance. The color conversion processing unit 205 outputs the changed RGB signals to a color gamma processing unit 206 and an evaluation value obtainment unit 208. The color gamma processing unit 206 applies gamma correction processing to the color components of the RGB signals that have been changed to achieve the preset color balance, and outputs the resultant RGB signals to a chrominance signal generation unit 207. The chrominance signal generation unit 207 generates chrominance signals R-Y and B-Y based on the input RGB signals, and outputs the chrominance signals R-Y and B-Y to the image memory 106 via the memory control unit 107.

It will be assumed that image data for recording is formed as luminance and chrominance signals, that is, Y, R-Y, and B-Y signals in the digital camera 100 according to the present embodiment. Specifically, along with a shooting operation, Y, R-Y, and B-Y signals stored in the image memory 106 are compressed and encoded by the codec unit 110 and recorded to the recording medium 112.

The evaluation value obtainment unit 208 obtains and outputs information (evaluation values) for analyzing how the subject is illuminated (illumination state) by a light source that really existed in a shooting environment (ambient light source). In later-described re-lighting control processing executed by the digital camera 100 according to the present embodiment, the evaluation value obtainment unit 208 obtains the following as the evaluation values: information of an average luminance of the subject, and information of luminance histograms that are in one-to-one correspondence with horizontal and vertical lines in a face region. It is sufficient to store the output information of the evaluation values to, for example, the system memory 122.

<Configuration of Re-Lighting Processing Unit 114>

Figure 3:
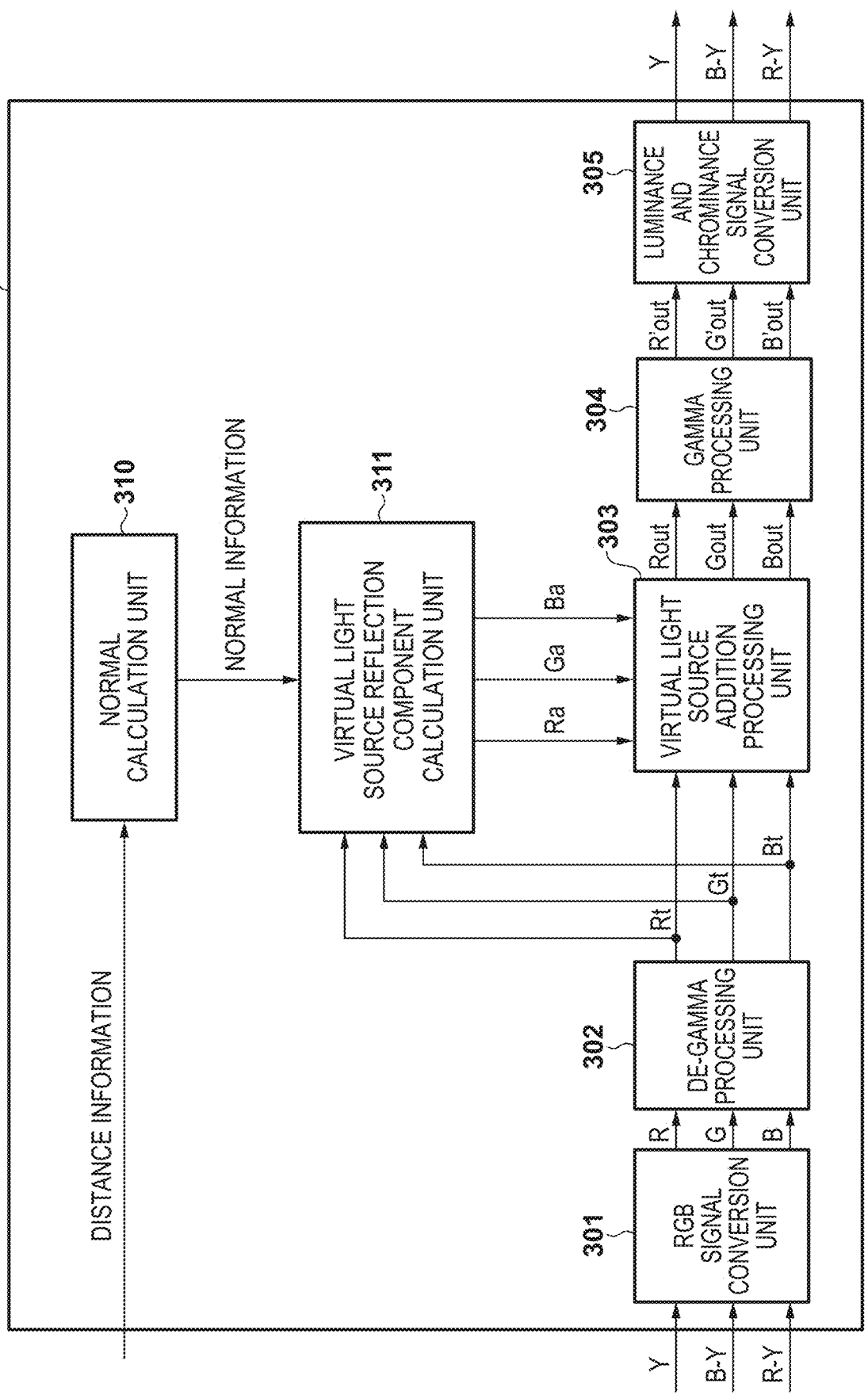
FIG. 3 is a block diagram showing a detailed configuration of a re-lighting processing unit 114 according to one or more embodiments of the present invention.

A configuration of the re-lighting processing unit 114 will now be described in detail using a block diagram of FIG. 3. In the following description, in a preset mode for applying the re-lighting processing, the re-lighting processing unit 114 of the digital camera 100 according to the present embodiment applies the processing to luminance and chrominance signals generated by the image processing unit 105. Alternatively, the re-lighting processing unit 114 may apply the processing to luminance and chrominance signals that have been read out from the recording medium 112 and extracted to the image memory 106.

An RGB signal conversion unit 301 converts input luminance and chrominance signals into RGB signals by applying predetermined color conversion processing thereto, and outputs the RGB signals to a de-gamma processing unit 302. Based on the gamma characteristics of gamma correction that has been applied to the input RGB signal, the de-gamma processing unit 302 executes de-gamma processing for eliminating the effect of the gamma correction. At the time of image capture, the de-gamma processing unit 302 converts the input RGB signals into pre-gamma correction linear signals using the inverse of the gamma characteristics of the gamma correction that has been applied by the color gamma processing unit 206. After applying the de-gamma processing, the de-gamma processing unit 302 outputs the RGB signals ($R_t$, $G_t$, $B_t$) to a virtual light source addition processing unit 303 and a later-described virtual light source reflection component calculation unit 311.

The virtual light source addition processing unit 303 applies the re-lighting processing for adding the effect of a virtual light source to the RGB signals derived from the de-gamma processing executed by the de-gamma processing unit 302. The effect of the virtual light source is added by adding RGB signals for addition ($R_a$, $G_a$, $B_a$) output from the virtual light source reflection component calculation unit 311.

The virtual light source reflection component calculation unit 311 calculates, for each color component, the effect exerted on the subject by placing the virtual light source. The virtual light source reflection component calculation unit 311 according to the present embodiment calculates the effect exerted when the virtual light source is placed to emit follow light or oblique light. Below, a description is given of processing of the blocks executed in relation to the generation of the RGB signals for addition by the virtual light source reflection component calculation unit 311 when the virtual light source is placed to emit follow light/oblique light.

A normal calculation unit 310 calculates a normal map for the subject based on subject distance information that has been obtained by the ranging sensor 124 along with image capture and that indicates a distribution of distances between the digital camera 100 and the subject. Any known technique may be used to generate the normal map based on the subject distance information; the following describes an exemplary method of generating the normal map using FIG. 4.

Figure 4:
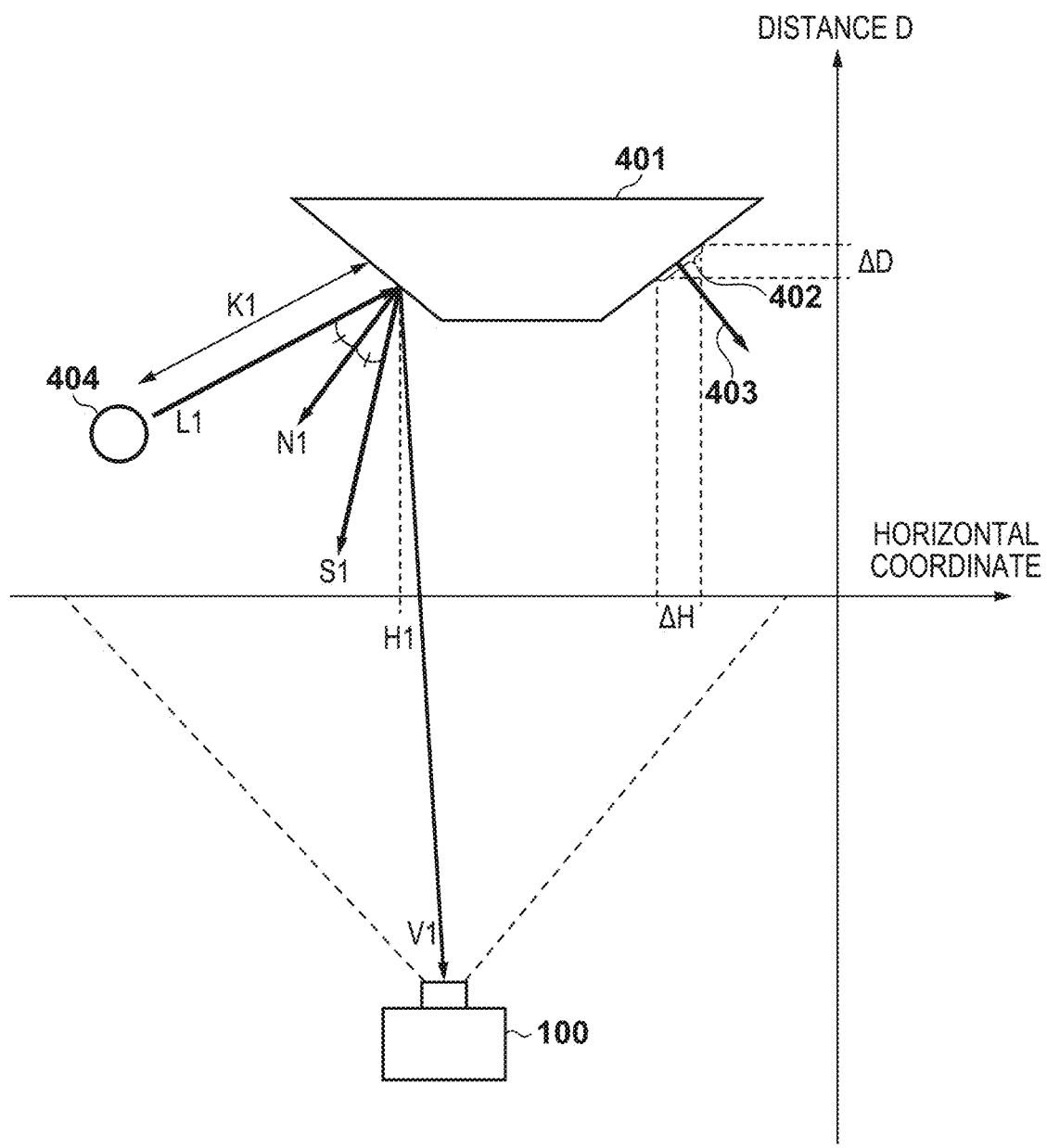
FIG. 4 is a diagram for describing the operations of a normal calculation unit 310 according to one of more embodiments of the present invention.

FIG. 4 shows a positional relationship between the digital camera 100 and a subject 401 on a plane formed by an optical axis of the digital camera 100 and a crosswise (horizontal) direction of an image sensor at the time of image capture. Provided that the subject 401 is shaped as shown in this figure, normal information 403 of a region 402 of the subject is obtained from a horizontal difference ΔH in the region 402 on a captured image and from a distance-wise (depth-wise) difference ΔD in the region 402 obtained from the subject distance information. More specifically, the normal 403 can be defined based on gradient information of the region 402 calculated based on ΔH and ΔD. Based on the subject distance information input in correspondence with the captured image, the normal calculation unit 310 forms the normal map by calculating pieces of normal information in one-to-one correspondence with pixels of the captured image, and outputs the normal map to the virtual light source reflection component calculation unit 311.

The virtual light source reflection component calculation unit 311 calculates the effect exerted by illuminating the subject with the virtual light source to be defined based on various virtual light source parameters and the following elements related to the subject: a distance K to the light source, normal information N, a specular reflection direction S, and a reflectance k. That is, the virtual light source reflection component calculation unit 311 calculates reflection components associated with the virtual light source that are reflected when the virtual light source illuminates the subject and are incident on the digital camera 100. Then, the virtual light source reflection component calculation unit 311 outputs the RGB signals ($R_a$, $G_a$, $B_a$) derived from computation of the reflection components to the virtual light source addition processing unit 303.

For example, in order to define a virtual point light source 404 shown in FIG. 4 as the virtual light source, the virtual light source reflection component calculation unit 311 calculates reflection components associated with the virtual light source that are derived from diffuse reflection and specular reflection of light emitted by the point light source on a surface of the subject. For simplicity, the example of FIG. 4 will be described below without taking into consideration a height direction (a direction of a normal to a plane formed by the horizontal direction and a direction of the optical axis (distance) in FIG. 4); however, it is understood that three-dimensional vectors may be taken into consideration in the calculation. For example, a value of a diffuse reflection component that arises on the subject at a horizontal pixel position H1 on the captured image is proportional to the inner product of a normal N1 at a corresponding position in the normal map and a direction vector L1 of a light beam reaching the subject from the virtual light source, and is inversely proportional to the square of a distance K1 between the virtual light source and the subject. On the other hand, a value of a specular reflection component, for which contribution to incidence on the digital camera 100 needs to be taken into consideration, is proportional to the inner product of a specular reflection direction S1 determined by the normal N1 and the direction vector L1 and a direction V1 from the subject toward the digital camera 100. In view of the above, the reflection components ($R_a$, $G_a$, $B_a$) that arise on the subject in association with the defined virtual light source can be expressed as follows using the RGB signals ($R_t$, $G_t$, $B_t$) derived from the de-gamma processing:

$$R_a = \sum_{Lights} \left\{ \alpha \times \left\{ k_d \times \frac{(-L \cdot N)}{K^2} \right\} + k_s \times (S \cdot V)^\beta \right\} \times R_w \times R_t$$

-continued $$G_a = \sum_{Lights} \left\{ \alpha \times \left( k_d \times \frac{(-L \cdot N)}{K^2} \right) + k_s \times (S \cdot V)^\beta \right\} \times 1 \times G_t$$

$$B_a = \sum_{Lights} \left\{ \alpha \times \left( k_d \times \frac{(-L \cdot N)}{K^2} \right) + k_s \times (S \cdot V)^\beta \right\} \times B_w \times B_t$$

Where, virtual light source parameters is represented by the intensity $\alpha$ and control values for the colors (tints) of the light source (red color component $R_w$ and blue color component $B_w$). Furthermore, $k_d$ and $k_s$ respectively represent the diffuse reflectance and specular reflectance of the subject, L represents a direction vector toward the subject, N represents a normal vector from the subject, K represents a distance between the light source and the subject, S represents a vector in the specular reflection direction, and V represents a direction vector from the subject toward the digital camera 100. In addition, $\beta$ is a parameter that represents a shininess coefficient indicating the spread of the specular reflection light, and the larger $\beta$, the steeper the specular reflection characteristics. As will be described later in relation to parameter determination processing, the digital camera 100 according to the present embodiment performs control such that parameters of virtual light sources to be defined and various reflectances of the subject under such light sources are dynamically determined based on the analysis of the captured image.

Thus, the virtual light source addition processing unit 303 generates output RGB signals reflecting a re-lighting result by adding the RGB signals of the reflection components thus obtained and the RGB signals derived from the de-gamma processing ($R_t$, $G_t$, $B_t$). That is, color components of the output RGB signals ($R_{out}$, $G_{out}$, $B_{out}$) are obtained as follows: $R_{out}=R_t+R_a$, $G_{out}=G_t+G_a$, and $B_{out}=B_t+B_a$.

A gamma processing unit 304 applies gamma correction processing to the output RGB signals generated by the virtual light source addition processing unit 303. After the application of the gamma correction, the output RGB signals are input to a luminance and chrominance signal conversion unit 305, converted into luminance and chrominance signals, and then output.

<<Parameter Determination Processing>>

Figure 5:
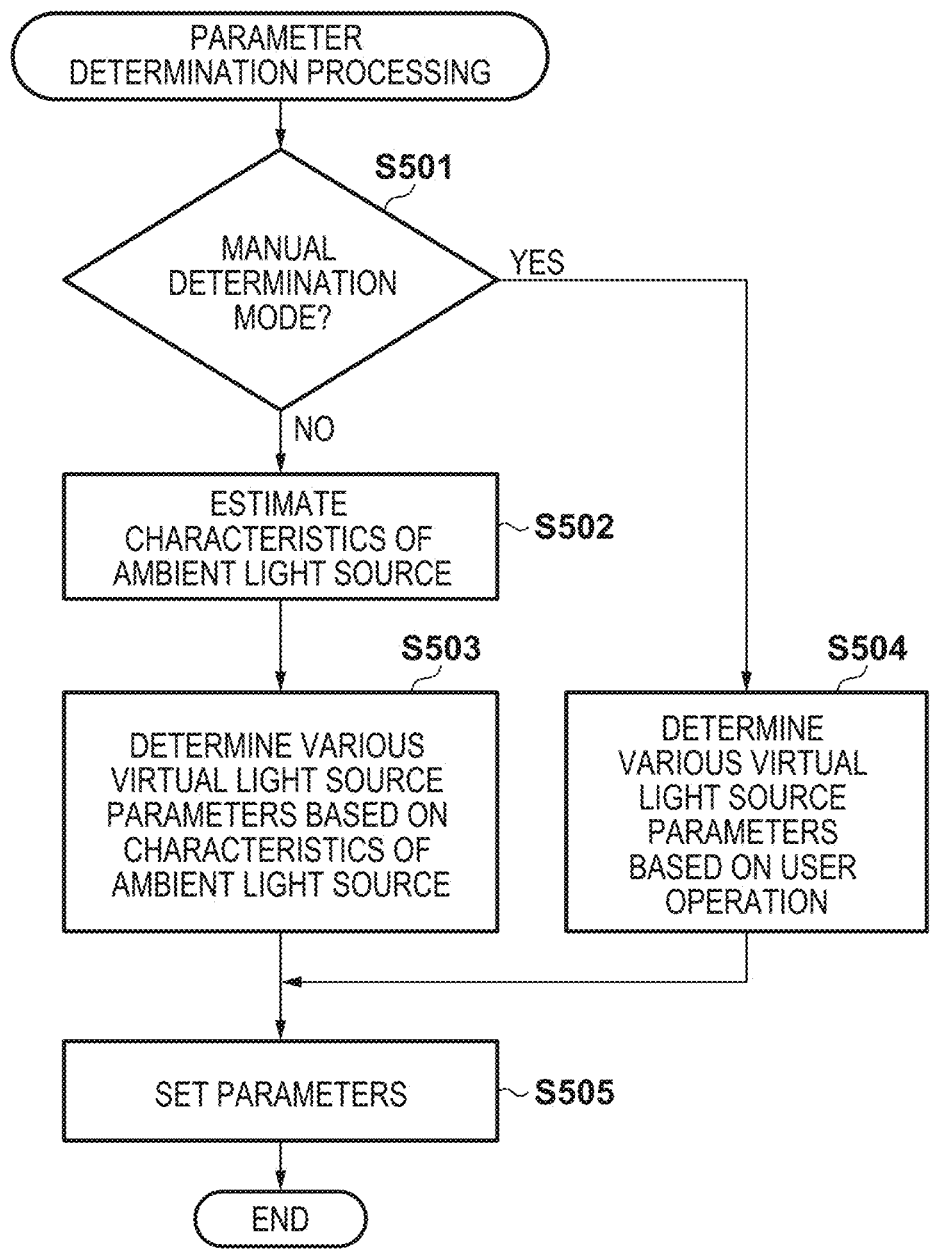
FIG. 5 is a flowchart exemplarily showing parameter determination processing executed by the digital camera 100 according to a first embodiment of the present invention.

Using a flowchart of FIG. 5, the following describes the specifics of the parameter determination processing that is executed by the digital camera 100 with the foregoing configuration according to the present embodiment prior to the re-lighting processing. In the following description, the parameter determination processing according to the present embodiment is executed prior to the re-lighting processing to determine operational parameters for the blocks of the re-lighting processing unit 114 used in the execution of the re-lighting processing. However, the parameters are not limited to being set at this timing, and the present parameter determination processing may be executed in parallel with the re-lighting processing. Processing corresponding to the flowchart can be realized as the system control unit 50 reads out a corresponding processing program stored in, for example, the nonvolatile memory 121, extracts the processing program to the system memory 122, and executes the processing program. In the following description, the present parameter determination processing is started upon detection of, for example, issuance of a shooting instruction while a shooting mode for executing the re-lighting processing is set.

In step S501, the system control unit 50 determines whether a mode currently set for re-lighting processing is a mode for manually determining virtual light source parameters. The system control unit 50 proceeds to step S504 if it determines that the current mode is the mode for manually determining the virtual light source parameters, and to step S502 if it determines that the current mode is a different mode.

In step S502, the system control unit 50 obtains information of evaluation values that have been generated by the evaluation value obtainment unit 208 with respect to a face region in a captured image, and estimates the characteristics of an ambient light source. Specifically, based on the information of the evaluation values, the system control unit 50 estimates an illumination direction of the ambient light source with respect to a subject and a diffusion degree of light from the ambient light source. The estimation in this step is realized by, for example, the following processing procedure.

Figure 6A:
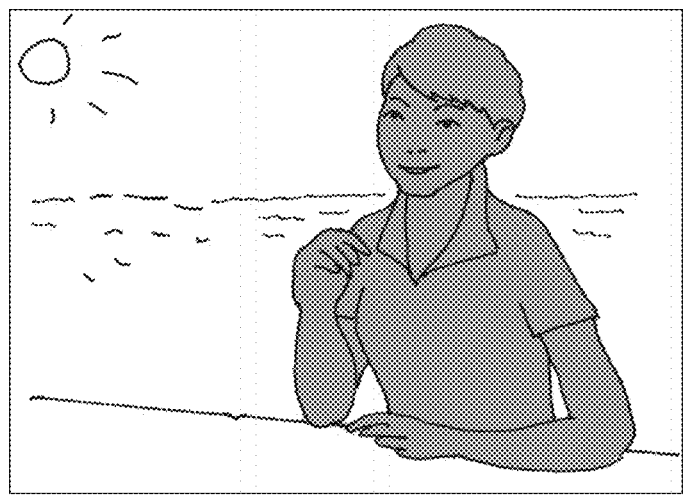
FIGS. 6A and 6B are diagrams for describing the estimation of the characteristics of an ambient light source according to one or more embodiments of the present invention.

First, the system control unit 50 determines whether a scene in which the captured image was obtained is a backlight scene. The system control unit 50 determines that the scene is the backlight scene if the following conditions are satisfied: the illuminance calculated based on exposure information at the time of image capture is higher than a predetermined threshold, and an upper region of the captured image exhibits a distribution of high luminances, as in the case of FIG. 6A for example. On the other hand, the system control unit 50 determines that the scene is not the backlight scene if the captured image does not satisfy such conditions, as in the case of FIG. 6B for example. It should be easily understood that the determination of the backlight scene is not limited to being made using this method, and may be made using any other method.

Figure 6B:
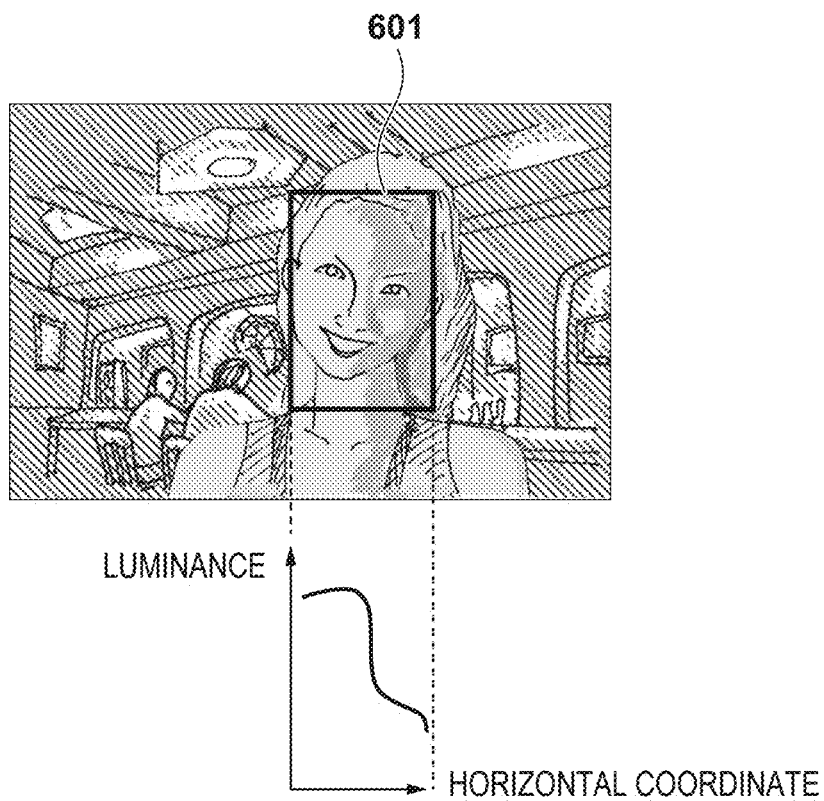

Next, the system control unit 50 estimates a direction of illumination by the ambient light source. This estimation may be made based on, for example, a luminance distribution in a face region serving as a main subject. FIG. 6B exemplarily depicts a case in which a horizontal luminance distribution in a face region 601 (a horizontal change in an average luminance value of face region pixels on the same vertical coordinate, or a horizontal luminance histogram) generally indicates a lower average luminance value for a larger horizontal coordinate. In this case, the system control unit 50 estimates that the ambient light source is on the left as viewed from the digital camera 100 and emitting light in a rightward direction in the captured image. Note that the result of the estimation of the illumination direction may include a determination result showing that the subject is illuminated from the front based on a vertical luminance distribution, in addition to a leftward or rightward direction.

The system control unit 50 also estimates a degree of diffusion (diffusion degree) of light emitted by the ambient light source. The system control unit 50 estimates the degree of diffusion because light from the ambient light source may be incident on the subject not only directly, but also through diffusion due to clouds, dust, and the like in and around a shooting environment. This estimation may be made based on a contrast (a difference between the maximum and minimum luminance values) of the subject obtained from the luminance distribution in the face region, similarly to the case of the illumination direction. In this case, specifically, the system control unit 50 estimates that intense light with a low diffusion degree is emitted if the contrast is higher than a predetermined threshold, and that soft light with a high diffusion degree is emitted if the contrast is lower than the predetermined threshold.

In step S503, in accordance with the estimated characteristics of the ambient light source, the system control unit 50 determines a position at which a virtual light source is to be defined and various reflectances of the subject illuminated by the virtual light source. In this step, the determination may be made in line with, for example, determination criteria of FIG. 7 that have been preset based on a combination of a diffusion degree and an illumination direction of the ambient light.

Figure 8A:
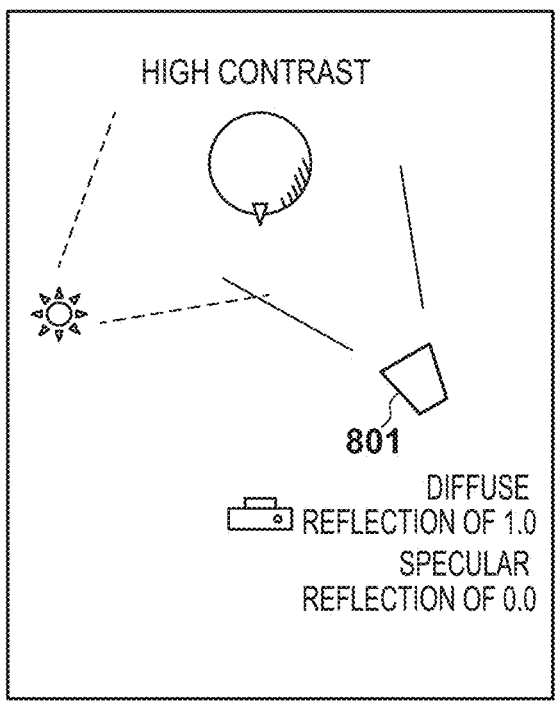
FIGS. 8A, 8B, 8C, and 8D are diagrams for describing various virtual light source parameters according to the first embodiment of the present invention.
Figure 9A:
FIGS. 9A, 9B, 9C, 9D, 9E, 9F, 9G, and 9H show examples of images before and after re-lighting processing according to the first embodiment of the present invention.
Figure 9B:
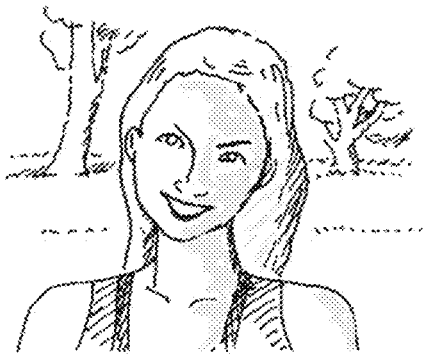

FIG. 8A shows an exemplary case in which the estimated characteristics of the ambient light source indicate that light with a low diffusion degree is obliquely (in a leftward or rightward direction) illuminating a subject (so-called oblique light). In this case, as intense (high-contrast) shadows are cast on the subject as shown in FIG. 9A, the system control unit 50 defines a virtual light source at a position 801 that is horizontally symmetric with the ambient light source to mitigate the shadows as shown in FIG. 8A. Furthermore, for the purpose of reducing the shadows, the reflectances of the subject illuminated by the virtual light source are determined such that only diffuse reflection occurs, specifically, a diffusion reflectance $k_d$ of 1.0 and a specular reflectance $k_s$ of 0.0 are set. Therefore, by executing the re-lighting processing using the virtual light source thus defined, the shadows cast on the subject are reduced in a resultant image as shown in FIG. 9B for example.

Figure 8B:
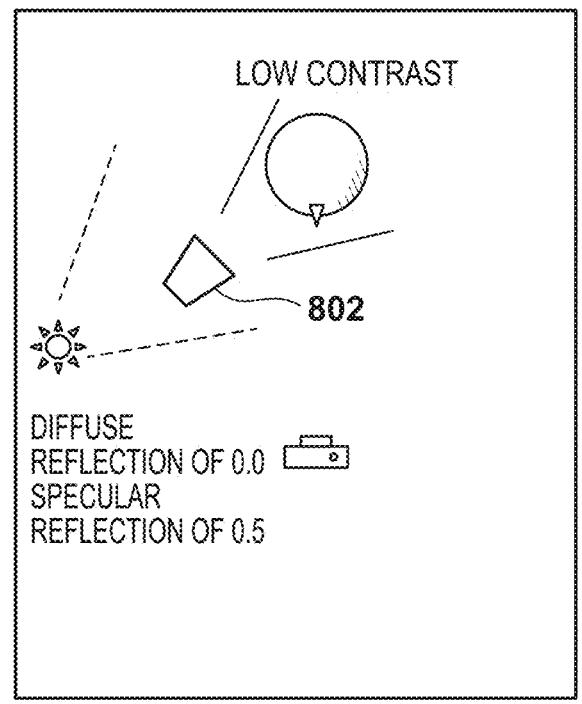
Figure 9C:
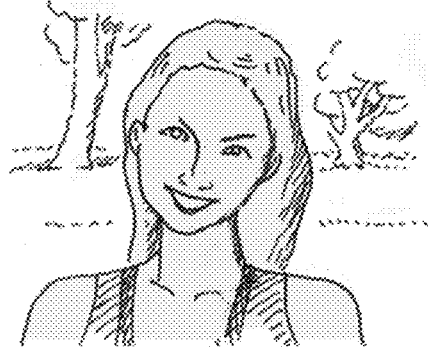
Figure 9D:
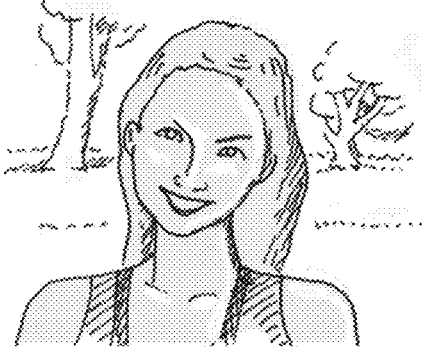

FIG. 8B shows an exemplary case in which the estimated characteristics of the ambient light source indicate that light with a high diffusion degree is obliquely illuminating a subject (oblique light). In this case, as high-contrast shadows are not cast on the subject due to the high diffusion degree as shown in FIG. 9C, the system control unit 50 defines a virtual light source at a position 802 for oblique illumination, similarly to the ambient light source shown in FIG. 8B, to exhibit a stereoscopic (dimensional) effect. In order to add luster and gloss to the low-contrast shadows for a natural stereoscopic effect, the position 802 is determined such that the virtual light source and the ambient light source illuminate the subject in the same direction. Furthermore, in order to represent luster and gloss, the reflectances of the subject illuminated by the virtual light source are determined such that only specular reflection occurs, specifically, a diffusion reflectance $k_d$ of 0.0 and a specular reflectance $k_s$ of 0.5 are set. In addition, a shininess coefficient β of 10.0 is set for the specular reflection to represent relatively steep reflection. Therefore, by executing the re-lighting processing using the virtual light source thus defined, a supplementary representation of reflection is added to the subject and the stereoscopic effect is enhanced as shown in FIG. 9D for example.

Figure 8C:
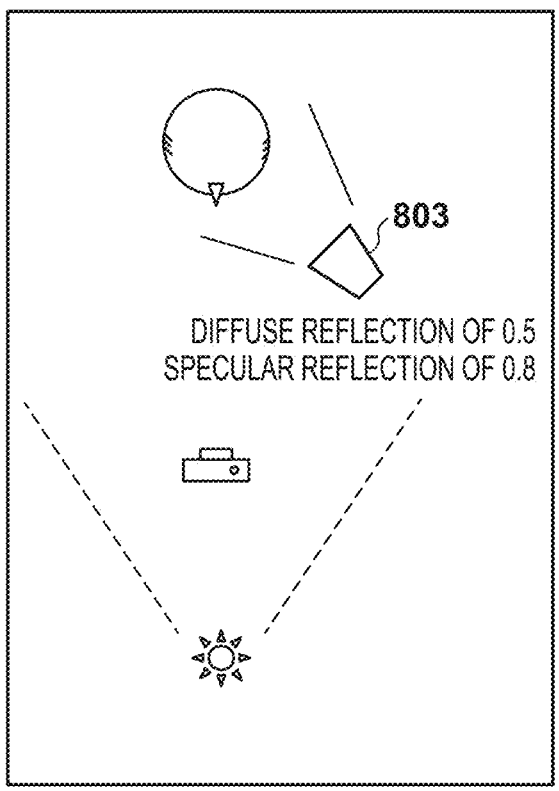
Figure 9E:
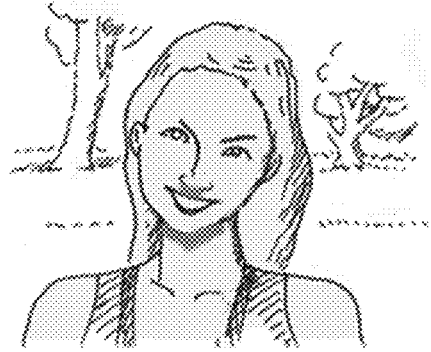
Figure 9F:
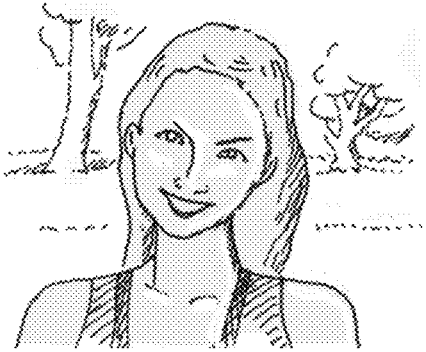

FIG. 8C shows an exemplary case in which the estimated characteristics of the ambient light source indicate that a subject is illuminated by light with a low diffusion degree from the front (so-called follow light). In this case, although a captured image gives an impression of flatness as shadows are not cast on the front of the subject, intense shadows appear on some parts, such as the nose and chin, as shown in FIG. 9E. In view of this, the system control unit 50 defines a virtual light source at a position 803 that is diagonal with respect to the subject as shown in FIG. 8C to add a stereoscopic effect while mitigating the intense shadows cast on some parts. Furthermore, for the purpose of reducing the shadows and adding the stereoscopic effect, the reflectances of the subject illuminated by the virtual light source are determined such that two types of reflection characteristics are exhibited, specifically, a diffusion reflectance $k_d$ of 0.5 and a specular reflectance $k_s$ of 0.8 are set. In addition, a shininess coefficient β of 10.0 is set for specular reflection to represent relatively steep reflection. Therefore, by executing the re-lighting processing using the virtual light source thus defined, the shadows cast on some parts of the subject are reduced and a representation of reflection with a stereoscopic impression is added to the entire face region as shown in FIG. 9F for example.

Figure 8D:
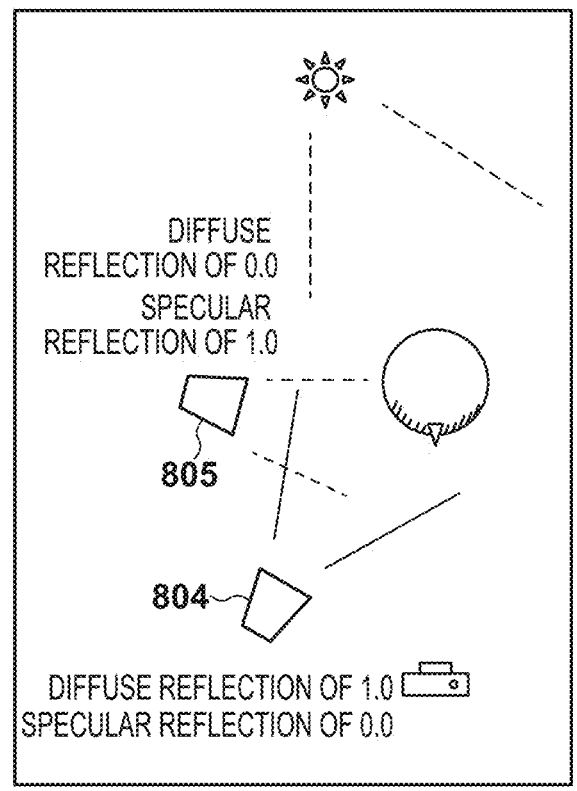
Figure 9G:
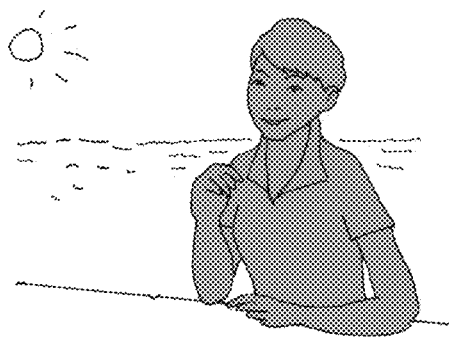
Figure 9H:
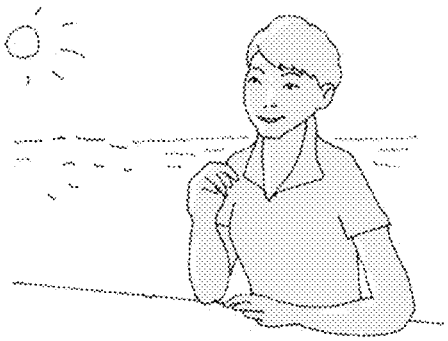

FIG. 8D shows an exemplary case in which the ambient light source has been estimated to emit backlight. In this case, as the ambient light is not illuminating the front of a subject, a captured image gives an impression of flatness with the dark subject and a low contrast as shown in FIG. 9G. In view of this, the system control unit 50 defines a virtual light source for increasing the brightness of the subject at a position 804, and defines a virtual light source for adding a stereoscopic effect at a position 805. In order to prevent the appearance of an unnatural illumination effect in the backlight scene, the virtual light source for adding the stereoscopic effect is defined, for example, on the side of the subject or another position that can be determined to be equivalent in depth to the subject in a depth direction. As shown in FIG. 8D, these two types of light sources with different purposes are defined at either side of the horizontal direction depending on the illumination direction of the ambient light source. More specifically, the system control unit 50 determines the horizontal positions at which the virtual light sources are to be defined such that the horizontal components of the estimated illumination direction of the ambient light source have the same positive or negative sign. Furthermore, as the virtual light sources have different purposes, values set as the reflectances of the subject illuminated by one light source are different from values set as the reflectances of the subject illuminated by another light source. That is, the reflectances under illumination by the virtual light source for increasing the brightness (at the position 804) are determined such that only diffusion reflection occurs, specifically, a diffusion reflectance $k_d$ of 1.0 and a specular reflectance $k_s$ of 0.0 are set. On the other hand, the reflectances under illumination by the virtual light source for adding the stereoscopic effect (at the position 805) are determined such that only specular reflection occurs, specifically, a diffusion reflectance $k_d$ of 0.0 and a specular reflectance $k_s$ of 1.0 are set. Furthermore, a shininess coefficient β of 5.0 is set for the specular reflection to represent reflection that adds a relatively mild highlight without giving an unnatural appearance to the backlight scene. Therefore, by executing the re-lighting processing using the virtual light source thus defined, a supplementary representation of reflection is added to the subject, the brightness is increased, and the stereoscopic effect is enhanced as shown in FIG. 9H for example.

If the system control unit 50 determines that the current mode is the mode for manually determining the virtual light source parameters in step S501, it determines a position at which a virtual light source is to be defined and various reflectances of the subject illuminated by the virtual light source based on a user's operational input in step S504. After making this determination, the system control unit 50 proceeds to step S505.

In step S505, the system control unit 50 supplies information of various virtual light source parameters that have been determined to the virtual light source reflection component calculation unit 311, configures the settings to use the parameters in the re-lighting processing, and terminates the present parameter determination processing.

In the foregoing exemplary description of the present embodiment, diffuse reflection and specular reflection are used as models of reflection on a subject under a virtual light source; however, models of reflection are not limited to them, and any model of reflection may be used. For example, a model of reflection utilizing the bidirectional reflectance distribution function (BRDF) and a model of reflection utilizing a simulation of internal scattering inside a subject may be used, and parameters of the reflective characteristics of such models may be controlled based on the way the ambient light reaches the subject.

In the foregoing description of the present embodiment, an illumination direction and a diffusion degree of an ambient light source that illuminates a subject are estimated as the characteristics of the ambient light source; however, any information that identifies the illuminating condition of the subject, such as a type and position of the ambient light source, may be used as the characteristics of the ambient light source.

In the foregoing description of the present embodiment, the reflectances under illumination by virtual light source are defined on a per-light source basis, and are constant regardless of a subject category; however, no limitation is intended in this regard. For example, for each subject category (e.g., a skin, hair, or clothes of a human), reference reflectances may be prestored, and values obtained by correcting the reference reflectances in accordance with the estimated characteristics of an ambient light source may be set as the corresponding reflectances. This enables a reduction in the intensity of specular reflection components and other adjustments in, for example, portions of a subject that are not desired to exhibit specular reflection, thereby achieving a more favorable re-lighting result.

As described above, the image processing apparatus according to the present embodiment can generate an image to which a favorable illumination effect has been added by defining a virtual light source with specific reflective characteristics during illumination based on the estimated characteristics of an ambient light source in an image capture environment.

Second Embodiment

In the description of the foregoing embodiment, the characteristics of an ambient light source estimated from a brightness distribution in a captured image are used to determine a position of a virtual light source to be defined and the reflective characteristics of a subject illuminated by the virtual light source. In the following description, the present embodiment adopts an approach to determining various virtual light source parameters based on a subject type, brightness, a shooting scene, and the like to achieve a re-lighting result that is more desirable for a photographer. It will be assumed that a functional configuration of a digital camera 100 according to the present embodiment is similar to a functional configuration of the digital camera 100 according to the first embodiment, and thus a description thereof will be omitted.

<<Parameter Determination Processing>>

Figure 10:
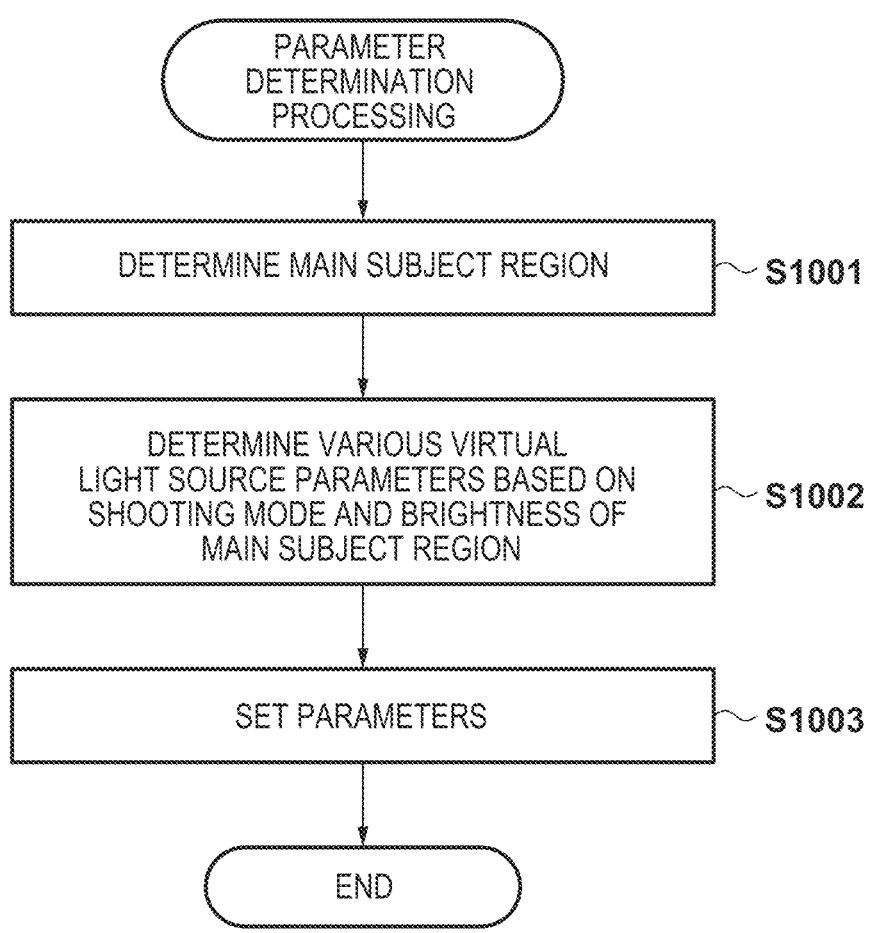
FIG. 10 is a flowchart exemplarily showing parameter determination processing executed by the digital camera 100 according to a second embodiment of the present invention.

Using a flowchart of FIG. 10, the following describes the specifics of parameter determination processing that is executed by the digital camera 100 according to the present embodiment prior to re-lighting processing. In the following description, the parameter determination processing according to the present embodiment is similarly executed prior to the re-lighting processing to determine operational parameters for the blocks of the re-lighting processing unit 114 used in the execution of the re-lighting processing. However, the parameters are not limited to being set at this timing, and the present parameter determination processing may be executed in parallel with the re-lighting processing. Processing corresponding to the present flowchart can be realized as the system control unit 50 reads out a corresponding processing program stored in, for example, the nonvolatile memory 121, extracts the processing program to the system memory 122, and executes the processing program. In the following description, the present parameter determination processing is started upon detection of, for example, issuance of a shooting instruction while a shooting mode for executing the re-lighting processing is set.

In order to identify a subject type and a shooting scene, the parameter determination processing according to the present embodiment uses information of a shooting mode that was set when a captured image was obtained. In the following description of the processing, a portrait mode, a food (shooting) mode, and a flower/plant mode with distinct subject types are used as examples of modes with easy-to-identify subject types as shown in FIG. 11; however, this should not restrict the use of other shooting modes. In other shooting modes, the processing may be executed such that the characteristics of a subject are taken into consideration, or preferences of an image editor are reflected, in determining various virtual light source parameters. For example, in a backlight portrait mode, an evening scene portrait mode, and the like, an illumination direction of an ambient light source and a main subject type can be identified, and thus can be taken into consideration in determining various virtual light source parameters in the following processing.

In step S1001, the system control unit 50 obtains information of a subject generated by the evaluation value obtainment unit 208 in relation to a captured image, and determines a main subject region based on the information. The main subject region may be determined using any method, for example, a method in which a human region detected by the face detection unit 113 is used as the main subject region, or a method in which a region having the same tints as a subject focused in the vicinity of the center of the captured image is used as the main subject region. The system control unit 50 also calculates information of the average brightness of the determined main subject region.

In step S1002, the system control unit 50 obtains information indicating a shooting mode that was set when the captured image was obtained, and determines various virtual light source parameters to be used in the re-lighting processing based on the information indicating the shooting mode and the brightness of the main subject region. That is, similarly to the first embodiment, the system control unit 50 determines a position of a virtual light source to be defined and the reflectances of the subject illuminated by the light source. In this step, the determination may be made in line with, for example, determination criteria of FIG. 11 that have been preset based on a combination of a shooting mode that was set and the brightness of the main subject region.

Figure 12A:
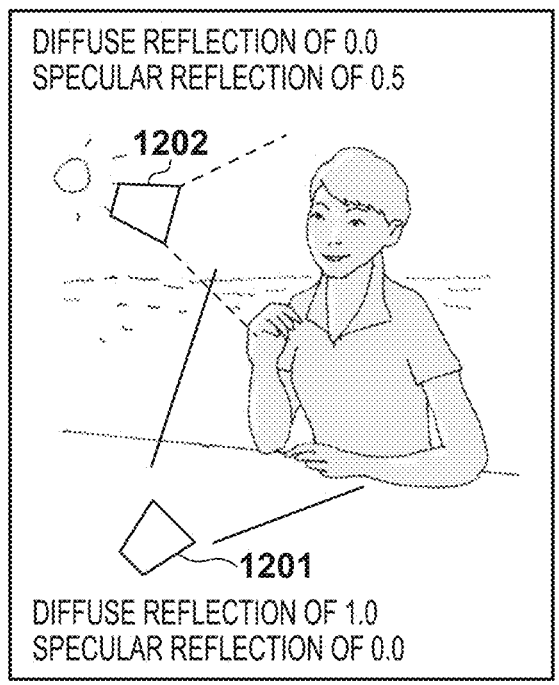
FIGS. 12A, 12B, and 12C are diagrams for describing various virtual light source parameters according to the second embodiment of the present invention.

FIG. 12A shows an exemplary case in which the shooting mode is the portrait mode and the average brightness of a human region serving as a main subject region has been determined to be lower than a predetermined threshold, that is, the human region has been determined to be dark. In this case, a virtual light source 1201 for brightening the main subject region is defined at a position that is diagonally in front of a main subject (smaller in depth than the main subject in a depth direction) so as to obliquely illuminate the main subject. Furthermore, the reflectances of the subject illuminated by the virtual light source 1201 are set such that light is reflected only by diffuse reflection, specifically, a diffusion reflectance $k_d$ of 1.0 and a specular reflectance $k_s$ of 0.0 are set. In addition, as the light reflected by the diffuse reflection alone exhibits a poor stereoscopic effect, a virtual light source 1202 for adding a stereoscopic effect is defined to illuminate the main subject from the side. The reflectances of the subject illuminated by the virtual light source 1202 are set such that light is reflected only by specular reflection, specifically, a diffusion reflectance $k_d$ of 0.0 and a specular reflectance $k_s$ of 0.5 are set. Furthermore, a shininess coefficient β of 5.0 is set for the specular reflection to exhibit the stereoscopic effect with a soft highlight. In this way, parameters that yield the re-lighting result shown in FIG. 9H can be determined without determining a backlight scene.

In a case in which the shooting mode is the portrait mode and the average brightness of the human region serving as the main subject region has been determined to be higher than the predetermined threshold, that is, the human region has been determined to be bright, only the virtual light source for adding the stereoscopic effect is defined. For example, it is sufficient to define only the virtual light source 1202 for the specular reflection shown in FIG. 12A.

Figure 12B:
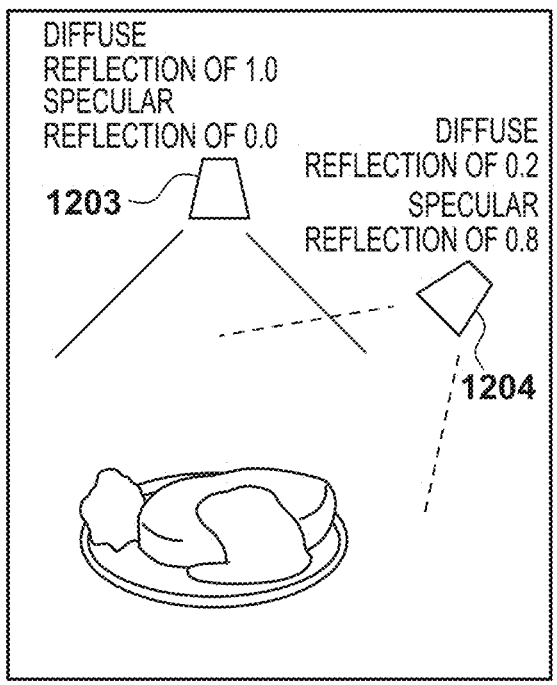

FIG. 12B shows an exemplary case in which the shooting mode is the food mode and the average brightness of an image region of food serving as a main subject has been determined to be lower than a predetermined threshold, that is, the image region has been determined to be dark. In this case, a virtual light source 1203 for brightening a main subject region is defined at a position above the main subject so as to illuminate the main subject from above. Furthermore, the reflectances of the subject illuminated by the virtual light source 1203 are set such that light is reflected only by diffuse reflection, specifically, a diffusion reflectance $k_d$ of 1.0 and a specular reflectance $k_s$ of 0.0 are set. In addition, a virtual light source 1204 for adding luster and a stereoscopic effect to the food is defined at a position that is diagonally behind the main subject (larger in depth than the main subject in a depth direction) so as to facilitate the appearance of the effect of specular reflection. The reflectances of the subject illuminated by the virtual light source 1204 are set such that light is reflected primarily by the specular reflection, specifically, a diffusion reflectance $k_d$ of 0.2 and a specular reflectance $k_s$ of 1.0 are set. A shininess coefficient β of 20.0 is set for the specular reflection to exhibit the stereoscopic effect with a relatively steep highlight.

In a case in which the shooting mode is the food mode and the average brightness of the image region of the food serving as the main subject has been determined to be higher than the predetermined threshold, that is, the image region has been determined to be bright, only the virtual light source for adding luster and the stereoscopic effect is defined. For example, it is sufficient to define only the virtual light source 1204 for the same purpose shown in FIG. 12B.

Figure 12C:
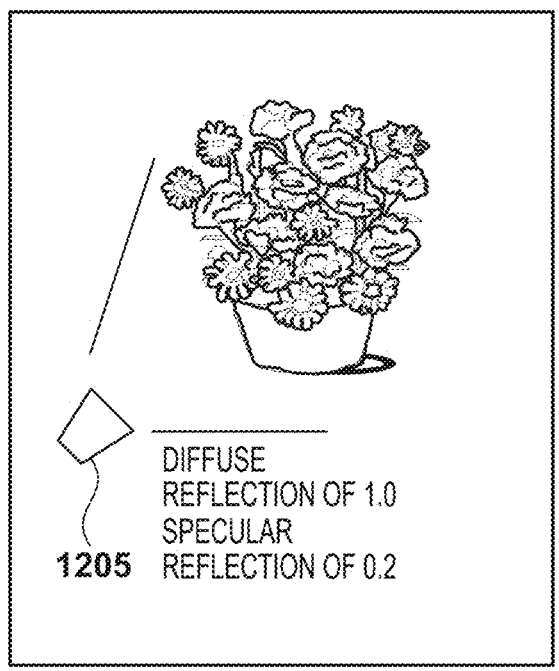

FIG. 12C shows an exemplary case in which the shooting mode is the flower/plant mode and the average brightness of an image region of flowers serving as a main subject has been determined to be lower than a predetermined threshold, that is, the image region has been determined to be dark. In this case, a virtual light source 1205 for brightening a main subject region is defined at a position that is diagonally in front of the main subject so as to obliquely illuminate the main subject. The reflectances of the subject illuminated by the virtual light source 1205 are set such that light is reflected primarily by diffuse reflection, specifically, a diffusion reflectance $k_d$ of 1.0 and a specular reflectance $k_s$ of 0.2 are set. In the case of the flower/plant mode, a shininess coefficient β of 3.0 is set for specular reflection to produce a gradual highlight, because defining the virtual light source to emphasize luster can yield an image with an unnatural impression through re-lighting. For a similar reason, a virtual light source for mainly producing specular reflection components is not defined in the flower/plant mode.

In a case in which the shooting mode is the flower/plant mode and the average brightness of an image region of plants serving as a main subject has been determined to be higher than the predetermined threshold, that is, the image region has been determined to be bright, no virtual light source is defined because it is unnecessary to execute the re-lighting processing using a virtual light source. That is, control is performed such that the re-lighting processing or processing of the virtual light source reflection component calculation unit 311 is not executed.

In step S1003, the system control unit 50 supplies information of various virtual light source parameters that have been determined to the virtual light source reflection component calculation unit 311, configures the settings to use the parameters in the re-lighting processing, and terminates the present parameter determination processing.

In the foregoing description of the present embodiment, various virtual light source parameters are determined based on a shooting mode and the average brightness of a main subject region; however, an item that is used in combination with a shooting mode to make this determination is not limited to the average brightness. For example, various virtual light source parameters may be determined by combining information of an illumination direction of an ambient light source used in the above-described first embodiment, or various virtual light source parameters may be determined based solely on a shooting mode.

Third Embodiment

As briefly mentioned in the first embodiment, when a subject is a human, for example, actual reflective characteristics of the subject vary with each subject category (e.g., a skin, hair, or clothes), and it is thus preferable that reflectances of a subject illuminated by a defined virtual light source vary with each subject category. On the other hand, for example, an illumination direction and other conditions for adding favorable effects vary with each part of a human face as follows: so-called catch light that causes the pupils to reflect light is compatible with the eyes, light that adds luster to the lips is compatible with the mouth, and light that enhances a stereoscopic effect on the nasal bridge is compatible with the nose. In the following description, the present embodiment adopts an approach to achieving a re-lighting result by defining a virtual light source such that illumination conditions and reflectances of a subject vary with each subject category specified. It will be assumed that a functional configuration of a digital camera 100 according to the present embodiment is similar to a functional configuration of the digital camera 100 according to the first embodiment, and thus a description thereof will be omitted.

<<Parameter Determination Processing>>

Figure 13:
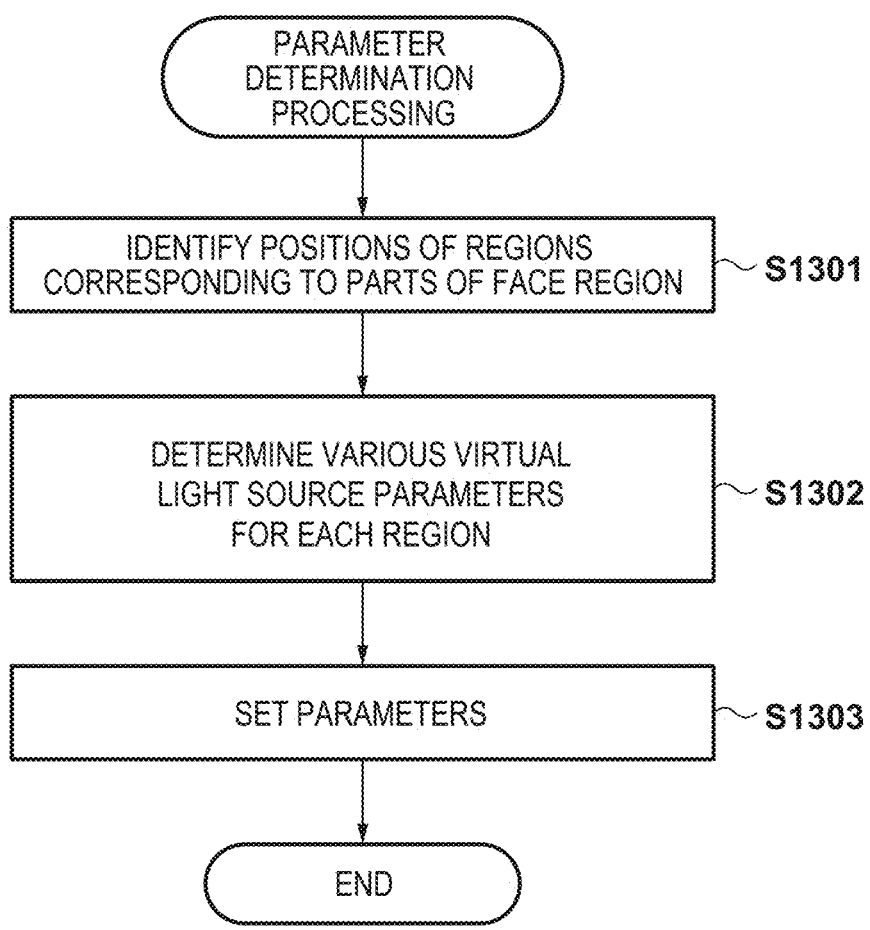
FIG. 13 is a flowchart exemplarily showing parameter determination processing executed by the digital camera 100 according to a third embodiment of the present invention.

Using a flowchart of FIG. 13, the following describes the specifics of parameter determination processing that is executed by the digital camera 100 according to the present embodiment prior to re-lighting processing. In the following description, the parameter determination processing according to the present embodiment is similarly executed prior to the re-lighting processing to determine operational parameters for the blocks of the re-lighting processing unit 114 used in the execution of the re-lighting processing. However, the parameters are not limited to being set at this timing, and the present parameter determination processing may be executed in parallel with the re-lighting processing. Processing corresponding to the present flowchart can be realized as the system control unit 50 reads out a corresponding processing program stored in, for example, the nonvolatile memory 121, extracts the processing program to the system memory 122, and executes the processing program. In the following description, the present parameter determination processing is started upon detection of, for example, issuance of a shooting instruction while a shooting mode for executing the re-lighting processing is set.

In step S1301, the system control unit 50 obtains information of the result of detection by the face detection unit 113 with respect to a face region in a captured image, and identifies regions of predetermined subject categories in the face region. Specifically, based on the result of detection, the system control unit 50 identifies the position of the face region and the positions of regions corresponding to the eyes, mouth, and nose in the face region.

In step S1302, for each region that has been positionally identified in step S1301, the system control unit 50 determines various virtual light source parameters corresponding to a subject category of the region. That is, for each part (the eyes, mouth, nose, or another region) of a main subject region including the face region, the system control unit 50 determines various virtual light source parameters that add an illumination effect in the re-lighting processing.

Figure 14A:
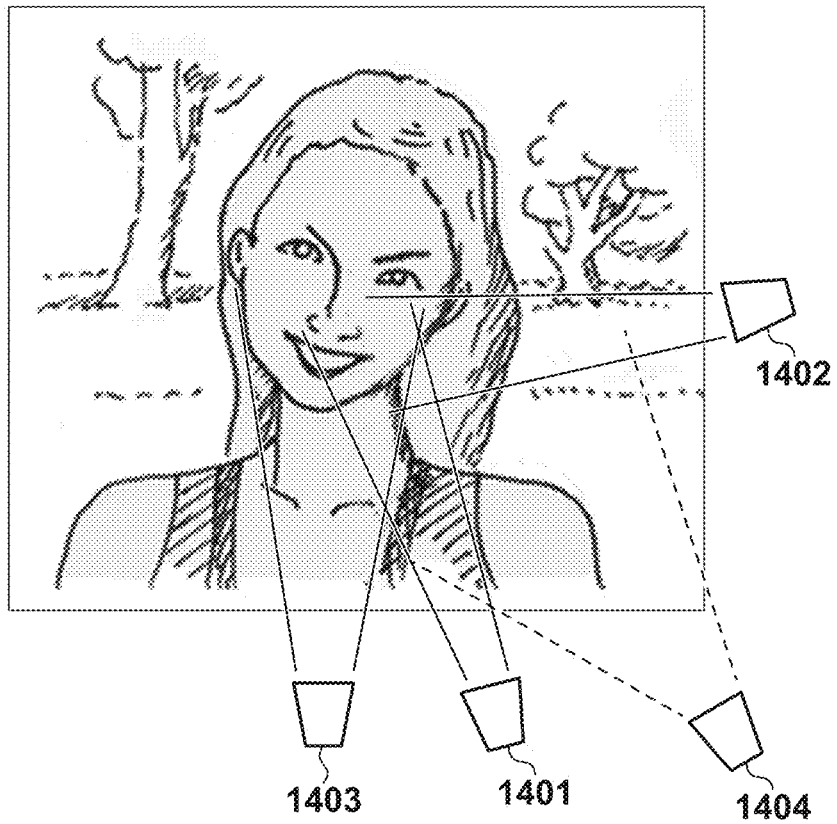
FIGS. 14A and 14B are diagrams for describing various virtual light source parameters according to the third embodiment of the present invention.

For example, with respect to a nose region, the system control unit 50 defines a virtual light source 1401 that illuminates the nose region from a position that is slightly displaced sideways from the front of the face (oblique illumination) to enhance the stereoscopic effect on the nasal bridge as shown in FIG. 14A. Furthermore, to enhance the stereoscopic effect on the nasal bridge, the reflectances of the nose region illuminated by the virtual light source 1401 are set such that light is reflected only by specular reflection, specifically, a diffusion reflectance $k_d$ of 0.0 and a specular reflectance $k_s$ of 0.8 are set. In addition, a shininess coefficient $\beta$ of 10.0 is set for the specular reflection to exhibit the stereoscopic effect with a relatively steep highlight.

For example, with respect to a mouth region, the system control unit 50 defines a virtual light source 1402 that illuminates the mouth region using oblique light from the vicinity of the side of the mouth to enhance luster of the lips as shown in FIG. 14A. Furthermore, to enhance luster of the lips, the reflectances of the mouth region illuminated by the virtual light source 1402 are set such that light is reflected only by specular reflection, specifically, a diffusion reflectance $k_d$ of 0.0 and a specular reflectance $k_s$ of 1.0 are set. In addition, a shininess coefficient $\beta$ of 30.0 is set for the specular reflection to produce a steep highlight and exhibit luster of the lips.

For example, with respect to an eye region, the system control unit 50 defines a virtual light source 1403 that illuminates the eye region from a position that is displaced downward from the front of the face to present shininess in the eyes by causing the pupils to reflect light as shown in FIG. 14A. Furthermore, to exhibit shininess in the eyes, the reflectances of the eye region illuminated by the virtual light source 1503 are set such that light is reflected only by specular reflection, specifically, a diffusion reflectance $k_d$ of 0.0 and a specular reflectance $k_s$ of 1.0 are set. In addition, a shininess coefficient $\beta$ of 50.0 is set for the specular reflection to produce a steep highlight and exhibit a catch light effect.

For example, with respect to other regions, the system control unit 50 defines a virtual light source 1404 that obliquely illuminates the main subject region as shown in FIG. 14A. Furthermore, the reflectances of other regions illuminated by the virtual light source 1404 are set such that light is reflected primarily by specular reflection, specifically, a diffusion reflectance $k_d$ of 0.2 and a specular reflectance $k_s$ of 0.8 are set. In addition, a shininess coefficient $\beta$ of 5.0 is set for the specular reflection to produce a gradual highlight and exhibit an overall stereoscopic effect.

Figure 14B:
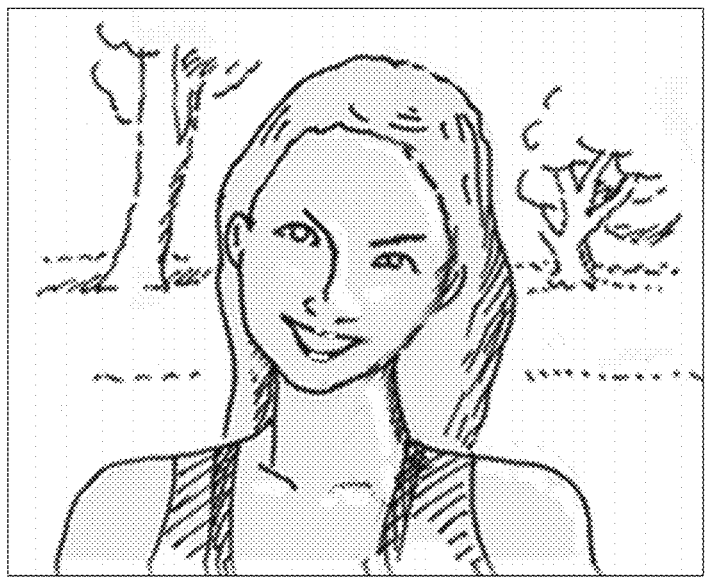

In step S1303, the system control unit 50 supplies information of various virtual light source parameters that have been determined to the virtual light source reflection component calculation unit 311, configures the settings to use the parameters in the re-lighting processing, and terminates the present parameter determination processing. At this time, in order to prevent the virtual light sources defined for specific regions from adding an illumination effect to other regions, the virtual light source reflection component calculation unit 311 performs control such that the two types of reflectances are both set to 0.0 for non-target regions. In this way, favorable effects are added to parts of the subject on a part-by-part basis as a result of re-lighting as shown in FIG. 14B.

In the foregoing description of the present embodiment, various virtual light source parameters determined for the eye, nose, and mouth regions in a face region of a human differ from those for other regions in the face region; however, the present invention is not limited to being embodied in this way. For example, a virtual light source used to add an illumination effect may vary with each specific subject category (e.g., an object, an animal, or food) rather than each specific human part. Therefore, provided that the re-lighting processing is applied to a main subject region, the invention according to the present embodiment can be applied as long as virtual light sources with different types of parameters are defined for different categories of subjects included in the main subject region.

In the foregoing description of the second and third embodiment, the reflective characteristics of a subject illuminated by a virtual light source are determined fundamentally based on the illuminating condition by an ambient light source, and further in consideration of a shooting mode used in shooting and a subject category. However, in embodying the present invention, the illuminating condition by an ambient light source need not necessarily be taken into consideration to determine the reflective characteristics, and the reflective characteristics may be determined based on a shooting mode used in shooting or a subject category.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus, comprising:
   a processor; and
   a memory including instructions that, when executed by the processor, cause the processor to function as:
   an obtaining unit configured to obtain an image derived from image capture; and
   an image processing unit configured to add an effect of a virtual light on a subject included in the image obtained by the obtaining unit,
   wherein the image processing unit determines the effect of the virtual light by determining, based on characteristics indicating an illumination direction of an ambient light, a direction of a virtual light illuminated by a first virtual light source and a direction of a virtual light illuminated by a second virtual light source,
   the first virtual light source is a virtual light source for increasing a brightness of the subject, and
   the second virtual light source is a virtual light source for adding a stereoscopic effect to the subject.

2. The image processing apparatus according to claim 1, wherein the virtual light source for increasing the brightness of the subject adds an effect caused by a diffusion reflection to the subject.

3. The image processing apparatus according to claim 1, wherein the virtual light source for adding a stereoscopic effect to the subject adds an effect caused by a specular reflection to the subject.

4. The image processing apparatus according to claim 1, wherein the direction of the virtual light illuminated by the first virtual light source and the direction of the virtual light illuminated by the second virtual light source are different.

5. The image processing apparatus according to claim 1, wherein the characteristics further indicate a diffusion degree of an ambient light source.

6. The image processing apparatus according to claim 1, wherein the characteristics further indicate a contrast of a subject region in the obtained image.

7. The image processing apparatus according to claim 1, wherein the characteristics further indicate a luminance distribution in a subject region of the obtained image.

8. The image processing apparatus according to claim 1, wherein in a case where the characteristics further indicate a backlight, the image processing unit adds effects of the virtual lights illuminated by the first virtual light source and the second virtual light source.

9. The image processing apparatus according to claim 1, wherein
   the virtual lights illuminated by the first virtual light source and the second virtual light source have parameters for adding effects caused by a diffusion reflection and a specular reflection, and
   the parameters are respectively defined.

10. A control method for an image processing apparatus, the control method comprising:
    obtaining an image derived from image capture; and
    adding an effect of a virtual light on a subject included in the obtained image,
    wherein the effect of the virtual light is determined by determining, based on characteristics indicating an illumination direction of an ambient light, a direction of a virtual light illuminated by a first virtual light source and a direction of a virtual light illuminated by a second virtual light source,
    the first virtual light source is a virtual light source for increasing a brightness of the subject, and
    the second virtual light source is a virtual light source for adding a stereoscopic effect to the subject.

11. A non-transitory computer readable storage medium storing a program to be used by an image processing apparatus, the program being configured to cause a computer of the image processing apparatus to execute:
    obtaining an image derived from image capture; and
    adding an effect of a virtual light on a subject included in the obtained image,
    wherein the effect of the virtual light is determined by determining, based on characteristics indicating an illumination direction of an ambient light, a direction of a virtual light illuminated by a first virtual light source and a direction of a virtual light illuminated by a second virtual light source,
    the first virtual light source is a virtual light source for increasing a brightness of the subject, and
    the second virtual light source is a virtual light source for adding a stereoscopic effect to the subject.

* * * * *